United States Patent
Albers

(10) Patent No.: US 8,323,051 B2
(45) Date of Patent: Dec. 4, 2012

(54) DEVICE FOR IMPLEMENTING A DRY ELECTRICAL CONNECTION OF A MOTOR VEHICLE LOCK

(75) Inventor: Sven Albers, Haan (DE)

(73) Assignee: Kiekert AG, Heiligenhaus (DE)

( * ) Notice: Subject to any disclaimer, the term of this patent is extended or adjusted under 35 U.S.C. 154(b) by 53 days.

(21) Appl. No.: 12/933,367

(22) PCT Filed: Mar. 14, 2009

(86) PCT No.: PCT/DE2009/000358
§ 371 (c)(1),
(2), (4) Date: Oct. 15, 2010

(87) PCT Pub. No.: WO2009/115080
PCT Pub. Date: Sep. 24, 2009

(65) Prior Publication Data
US 2011/0034042 A1    Feb. 10, 2011

(30) Foreign Application Priority Data
Mar. 20, 2008   (DE) .................... 20 2008 003 886 U

(51) Int. Cl.
*H01R 13/73* (2006.01)
(52) U.S. Cl. ....................................... 439/559; 439/926

(58) Field of Classification Search .................. 439/556, 439/559, 926
See application file for complete search history.

(56) References Cited

U.S. PATENT DOCUMENTS

| | | | |
|---|---|---|---|
| 6,051,794 A * | 4/2000 | Katou et al. | 174/152 G |
| 6,398,582 B1 * | 6/2002 | Matsuyama et al. | 439/559 |
| 7,279,817 B2 * | 10/2007 | Adachi et al. | 310/71 |
| 7,461,873 B2 * | 12/2008 | Machida | 292/337 |
| 7,679,236 B2 * | 3/2010 | Kanou et al. | 310/71 |

FOREIGN PATENT DOCUMENTS

| | | |
|---|---|---|
| DE | 20 2006 007 263 U1 | 7/2006 |
| FR | 2802153 A1 | 6/2001 |

* cited by examiner

*Primary Examiner* — Thanh Tam Le
(74) *Attorney, Agent, or Firm* — Konomi Takeshita

(57) ABSTRACT

A device (1) for implementing a dry electrical connection of a motor vehicle lock (27), comprising a fastening part (2) for a lock housing (3), wherein an electrical connection to the lock housing (3) can be implemented through an opening (4) of the fastening part (2) from a first side (5) of the fastening part (2), wherein the lock housing (3) has an external plug (7) that is positioned at a distance to the fastening part (2) and at the circumference (8) of which a flexible collar (9) is fastened, extending to the first side (5) of the fastening part (2) and forming a seal (11) with a second distance (10) to the opening (4) of the fastening part (2).

1 Claim, 4 Drawing Sheets

DEVICE FOR IMPLEMENTING A DRY ELECTRICAL CONNECTION OF A MOTOR VEHICLE LOCK

CROSS REFERENCE TO RELATED APPLICATIONS

This application claims priority under 35 U.S.C. 119 and 35 U.S.C. 365 based upon German Patent Application No. 20 2008 003 886.3, filed on Mar. 20, 2008. The entire disclosure of the aforesaid application is incorporated herein by reference.

FIELD OF THE INVENTION

The present invention relates to a device comprising a fastening part for a lock housing, wherein an electrical connection to the lock housing can be implemented through an opening of the fastening part from a first side of the fastening part, in which the fastening part in particular constitutes a boundary between a dry chamber and a wet region in a motor vehicle door, wherein the electrical connection to the lock housing is positioned in the wet region.

BACKGROUND OF THE INVENTION

In order to provide an electrical connection to the individual components of a motor vehicle door lock, such as electric motors, micro switches, sensors, etc., the opening may have to be sealed to ensure that any moisture that may occur in the area outside of the lock housing cannot penetrate the opposite side of the fastening part and/or the electrical connections. In order to achieve this, numerous different measures have already been suggested which have, however, only to some extent fulfilled the requirements for a compact design, simple installation, inexpensive production and/or a permanent sealing.

The invention has the task of at least partially solving the said problems of prior art embodiments. In particular it aims to provide devices that provide a moisture seal even in case of relatively high production tolerances of the components to be joined. At the same time, the sealing components should be cheap to produce and should be installable under different operating conditions.

SUMMARY OF THE INVENTION

These tasks are solved by a device according to the characteristics of claim 1. Other advantageous embodiments are described in the subsequent dependent claims. The description, in particular, with reference to the figures, explains the invention in detail and provides further examples of embodiments.

The device of the invention comprises a fastening component for a lock housing, wherein an electrical connection to the lock housing is implemented through the opening of the fastening part from a first side of the fastening part. The lock housing also has an external plug that is positioned at a distance to the fastening part. A flexible collar is attached to the circumference of the plug, said collar extending up to the first side of the fastening part and forming a seal with a distance to the opening of the fastening part.

Apart from the electronic components, the lock housing also houses a so-called locking mechanism, generally comprising at least a pawl and a rotary latch. The electronic or electrical components in the actual lock housing can serve to operate the locking mechanism and/or for monitoring certain positions of the locking mechanism. It must in any case be ensured that these electronic or electrical components can be supplied with power which is provided via the plug. Preferably, the lock housing is made of plastic as is the external plug. "External" means in particular that the plug protrudes, i.e. projects beyond the lock housing. In the installed position of the lock housing or of the plug attached thereto, the plug is however located at a distance to the opening. In other words this means that there is no contact between the plug and the fastening part or opening. In order to seal the space between the plug and the opening or fastening part against moisture, a flexible collar is suggested in this case. The collar is on one hand arranged at the circumference of the external plug. From this point the flexible collar extends up to the fastening part. Here, too, said collar does not directly cooperate with the opening but forms an in particular moisture-tight seal at a specified distance to the opening on the surface of the fastening part. The distance is at least several millimeters, preferably more than 10 mm. This arrangement of the collar ensures a seal even where the position or shape of the opening is produced with higher manufacturing tolerances as part of a series production. The distance between the plug and the opening can also be bridged by a simply constructed sealing means.

Particularly preferred is the arrangement in which the fastening part is a door module carrier for a motor vehicle door, which at least partially constitutes a boundary between a wet region and a dry chamber of the motor vehicle door, with the first side of the fastening part facing the wet region. A "door module carrier" refers in particular to a part, accommodating components or assemblies important for the functioning inside the door. These include in particular closing systems, drives for electric windows, drive systems for the actual motor vehicle door, etc. In a motor vehicle door the dry chamber always faces the passenger compartment, whilst the wet region faces the outside of the door. These two areas can in particular be sealed using said door module carrier.

It is furthermore regarded as advantageous if the plug is arranged opposite the opening, in particular in such a way that the plug and opening are positioned on a common axis transversely to the fastening part. This allows for instance the option of installing a connecting plug through the opening straight to the plug of the lock housing. The opening can in this case also serve as an alignment aid or guide.

It is also suggested that the plug is a separate component from the lock housing and in particular a component installed on the lock housing. In other words this means in particular that the plug does not form one part together with the lock housing but is made of a different material or a different material shape.

According to a further development, the flexible collar is made of a rubber-like material. The flexible collar is thus made of a very resistant and flexible material so that in particular also relative movements of the plug and the fastening part can be compensated for during subsequent application in a motor vehicle even under extreme temperature conditions and vehicle vibrations.

It is also advantageous that the flexible collar at the circumference of the plug contains a basic section that is reinforced and provides in particular one of the following characteristics: a greater material thickness compared to other sections of the flexible collar, at least one embedment of a material differing from the material of other sections of the flexible collar, at least one reinforcement structure. These measures ensure in particular the secure fastening of the flexible collar at the circumference of the plug. A greater material thickness in the area of the basic sections improves the inherent stability and thus prevents in particular a detachment of the plug. The material embedment can be provided on the outside and/or inside of the collar. In particular the embedment allows the exertion of a higher pressing force in the direction of the plug along the circumference. Embedments can in particular consist of circumferential spring washers or similar. For this purpose a material with a greater deformation resistance than that of the flexible collar is used in particular, such as also metal. Also, reinforcement structures may be provided that increase for instance the rigidity and/or cooperate with external means to provide a kind of fixing.

The flexible collar can also be captively attached to the circumference of the plug. This can be achieved by positive form locking or, where applicable, also by material-to-material connections or glued connections.

In a further development of the device a flexible collar in a sealing section on the fastening part contains in particular a circumferential bead. The bead forms in particular a type of bulge in the end region of the collar, arranged circumferentially, with the bead of the collar abutting the fastening part. The bead reinforces the opening cross section of the collar in this area, preventing in particular buckling of the flexible collar during installation. It also ensures that the collar reliably extends a certain distance over the opposing opening.

The flexible collar can also form a spring element between a basic section on the circumference of the plug and a sealing section on the fastening part with which the sealing section is pressed against the fastening part. The spring element can in particular be formed by upsetting or forming a material section of the flexible collar, resulting in an elastic deformation of the flexible collar (only) in the area between the basic section and the sealing section. This presses the sealing section towards the fastening part, producing a prestressed sealing seat.

In a preferred embodiment, the flexible collar also only abuts against the fastening part. This means in particular that additional sealing and fixing means are provided. This also allows the sealing section to displace slightly compared to the fastening part in extreme situations, with the sealing being guaranteed by sufficient contact pressure on the first side of the fastening part.

According to a further development of the device the flexible collar between the basic section on the circumference of the plug and the sealing section on the fastening part forms an in particular smooth cone, opening towards the sealing section. This shows in particular that the opening cross section widens from the plug towards the opening, with "cone" equally referring in this context to the internal and external lateral surfaces of the flexible collar. "Smooth" aims to show in particular that no bellows or similar are provided in this case, allowing a simpler manufacture of the flexible collar.

It is furthermore advantageous that the flexible collar forms a basic section on the circumference of the plug and a sealing section on the fastening part, with the basic section and sealing section having a different opening cross section. Here, too, the flexible collar offers considerable freedom of design as regards the two components to be sealed from each other. The opening cross section in the area of the basic section does in particular have a different cross-sectional shape, such as a square shape, compared to a mainly round opening cross section in the area of the sealing section.

Furthermore it can be advantageous, if the fastening part in the area of the opening is dome-shaped towards the lock housing. In this case such a radius of curvature of the dome shape has to be chosen that it connects to or protrudes into the opening cross section in the area of the sealing section of the flexible collar. This can further improve the sealing seat. It is also preferred that the dome shape is larger than the opening cross section of the collar in the area of the sealing section.

In particular in this context it is regarded to be advantageous that the lock housing is fixed to the fastening part with fastening means that are spaced apart from the dome shape. So the fastening means should in particular not penetrate the dome shape. The fastening means are normally bolts, rivets and other detachable and/or not detachable connections.

In a particularly simple design of such a lock all electrical connections for the operation of the lock run for instance through a plug with the flexible collar into the dry chamber of the motor vehicle.

It is also advantageous that the plug has a neck on its circumference surrounded by a basic section of the flexible collar. The design thus realizes a positive locking fit, forming for instance a type of labyrinth seal. It is preferred that the collar only surrounds the neck, so that generally no further means of fixing and/or sealing are required at this point.

It can also be advantageous that the lock housing contains spacing elements towards the fastening part. These can, for instance, also cooperate with the dome shape of a fastening part, thus preventing the plug or the lock housing from coming still closer to the fastening part.

BRIEF DESCRIPTION OF THE DRAWINGS

The invention as well as the technical background is explained below in more detail with reference to the enclosed figures. It must be pointed out that the figures illustrate preferred embodiments of the invention but that the invention is not limited to such embodiments.

In the below figures.

Other features and advantages of the present invention will become apparent from the following detailed description, taken in conjunction with the accompanying drawings which illustrate, by way of example, the principles of the invention.

DETAILED DESCRIPTION OF THE INVENTION

Figure 1:
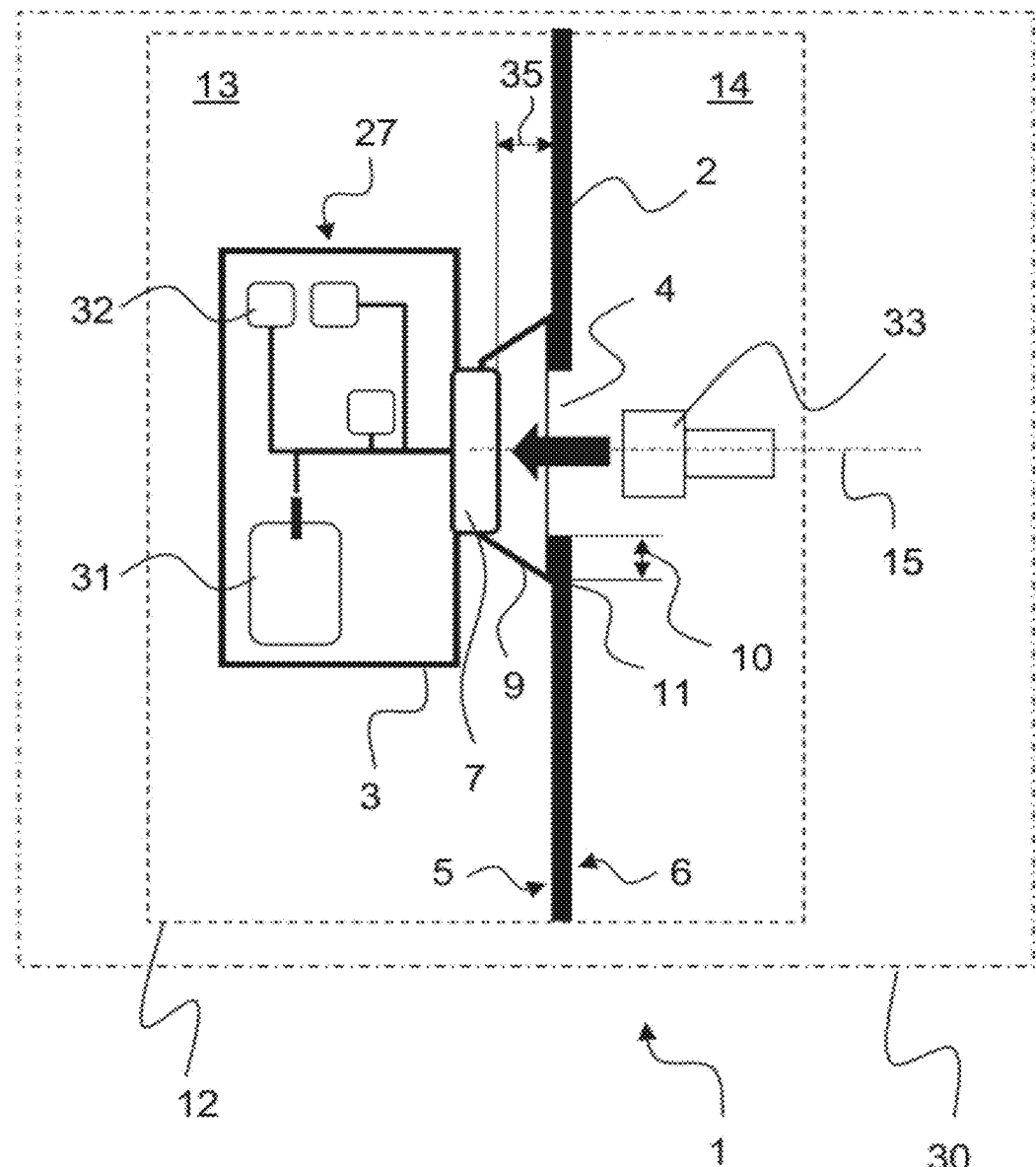
FIG. 1 shows a first embodiment of the device according to the invention.

FIG. 1 contains a schematic illustration of a device 1 according to the invention in a motor vehicle 30. The motor vehicle 30 comprises a motor vehicle door 12 with a fastening part 2 extending through said door. The fastening part 2 separates the inside area of the motor vehicle door 12 into a wet region 13 and a dry chamber 14. The wet region 13 contains a lock 27, accommodating for instance different electrical or electronic components surrounded by a lock housing 3. As an example of such electrical or electronic components, various sensors 32 and a motor 31 are shown in this figure. These contain respective electrical connections, realizing an electrical connection to the dry chamber 14 via plug 7. The lock housing 3 is now fixed in such a way to a first side 5, facing the wet region 13, that the protruding external plug 7 is positioned at a distance 35 to the fastening part 2 or the opening 4 contained therein. This plug 7 is provided with a flexible collar 9 bridging this distance 35. The flexible collar 9 has such an opening shape that it abuts against the first side 5 of the fastening part 2, forming a seal 11 and in particular a moisture seal with a second distance 10 to the opening 4. Because of the shape or fixing of the flexible collar 9 it is now possible, easy and for instance without having to worry about damaging the flexible collar 9 to insert a connecting plug 33 on the dry chamber 14 or the second side 6 of the fastening part 2 along axis 15 through opening 4 up to the plug 7 and thus realize the electrical connection.

Figure 2:
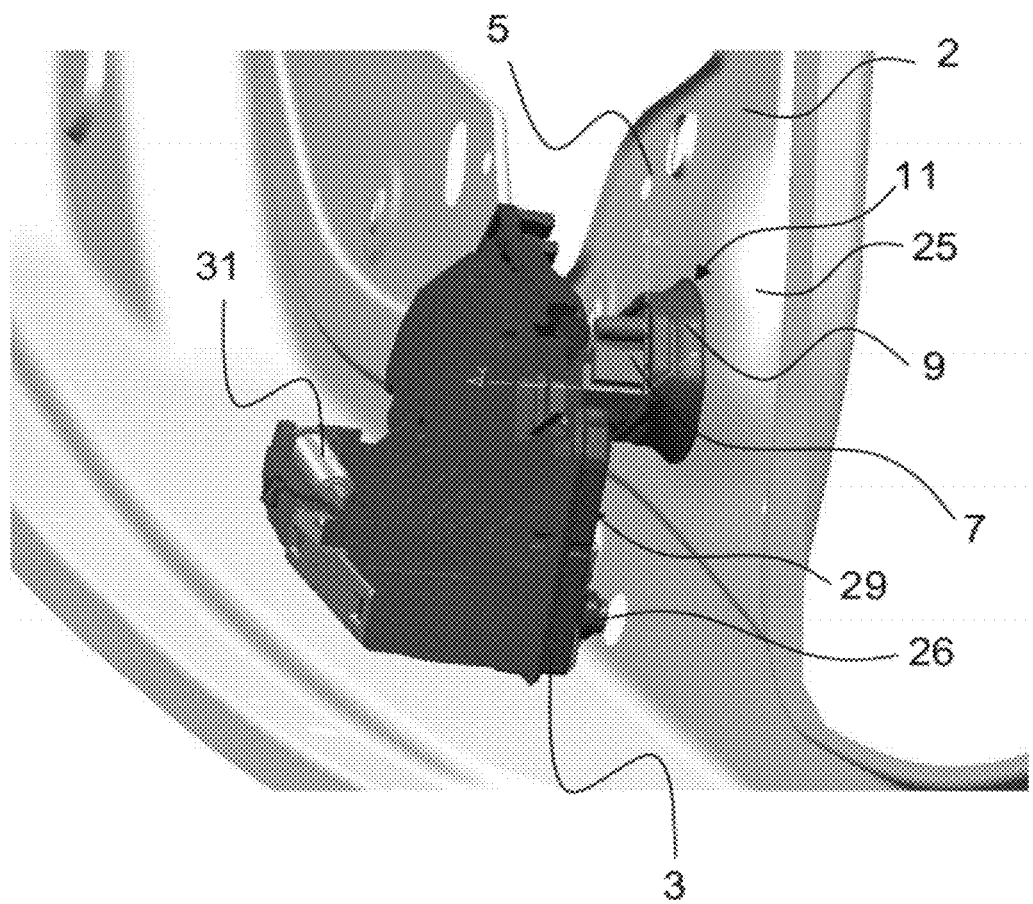
FIG. 2 shows a perspective view of another embodiment of the device of the invention.

FIG. 2 shows a perspective view of a lock housing 3 on a fastening part 2 in the style of a door module carrier. The lock housing 3 is mounted on the first side 5 of the fastening part 2. The lock housing 3 is mounted with the aid of fastening means 26, extending for instance also partially through the fastening part 2. In addition and in particular closer to the plug 7, spacers 29 are provided, limiting a tilting effect of the lock housing 3 around the fastening means 26. The fastening part 2 also contains a dome shape 25, protruding towards the lock housing 3. It has a larger surface than the flexible collar 9 and provides a seal 11 together with the collar 9. The spacers 29 and the fastening means 26 are positioned at a distance to this dome shape 25 in this figure.

Figure 3:
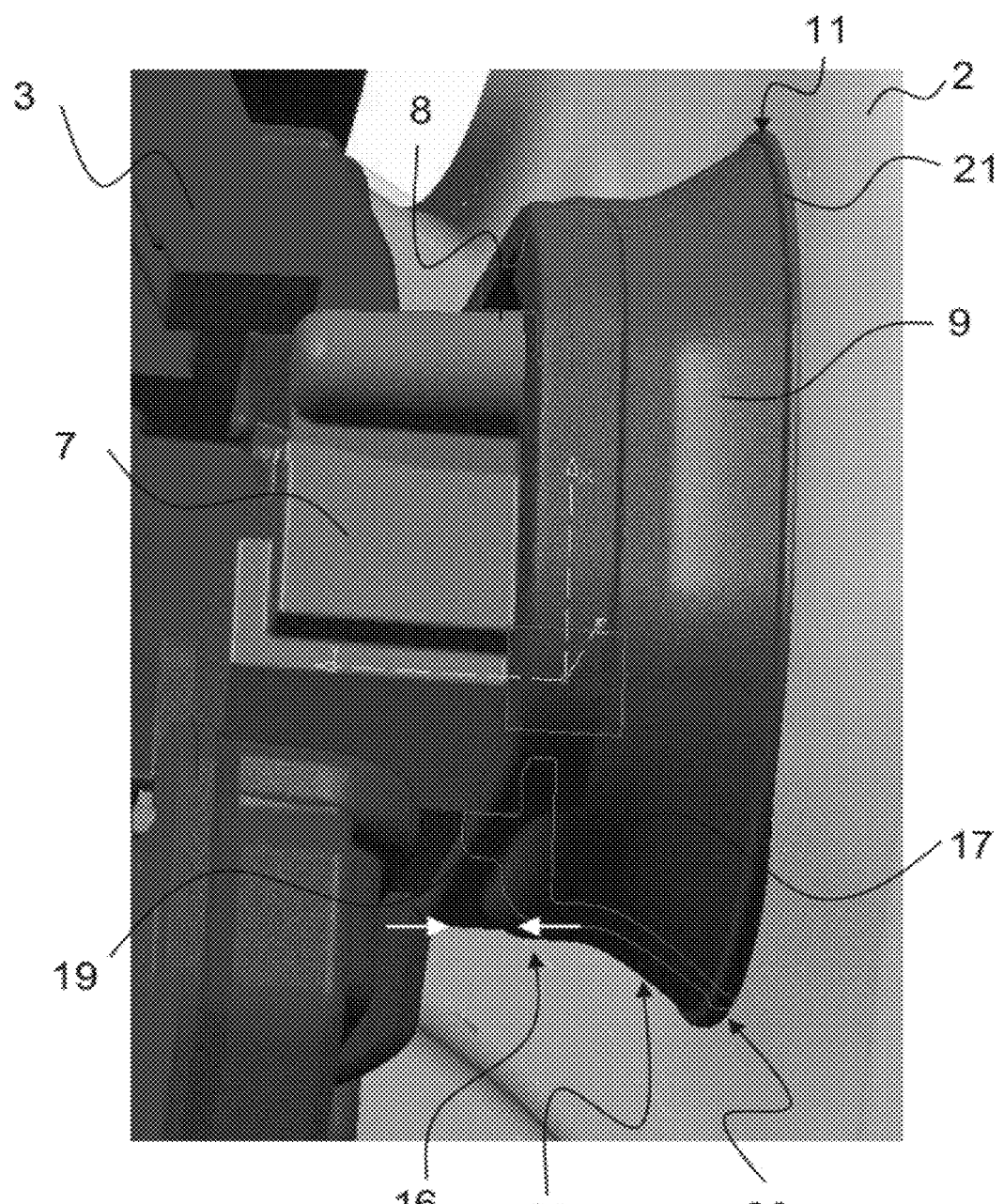
FIG. 3 shows a detail of another embodiment of the device of the invention.

FIG. 3 also provides a diagrammatic illustration and shows at the same time an indicated cross section of a preferred embodiment of the collar 9 of the invention. The left partial section of FIG. 3 again shows the lock housing 3, on which the separate, external plug 7 is positioned. The flexible collar 9 abuts against the circumference 8 of the plug 7. In the area of the plug 7 the collar 9 contains a basic section 16 and in the area of the fastening part 2 a sealing section 20. The basic section 16 has a greater material thickness 17 than the other sections of the collar 9 as well as an additional, circumferential reinforcement structure 19. Both measures serve to provide a reliable, moisture-proof connection to the plug 7 even if the other sections of the flexible collar 9 are deformed. Sealing section 20 also shows a greater material thickness 17, forming a type of bead 21. The bead 21 is also circumferential and ultimately provides the seal 11 to the fastening part 2. Between the basic section 16 and the sealing section 20, the collar 9 has a relatively thin wall, i.e. has a thin and in particular the thinnest material thickness 17. This forms in particular a spring element 22. This spring element 22 produces on one hand a secure contact of the bead 21 against the fastening part 2 and compensates, where necessary, for a relative movement of the plug 7 in relation to the fastening part 2.

Figure 4:
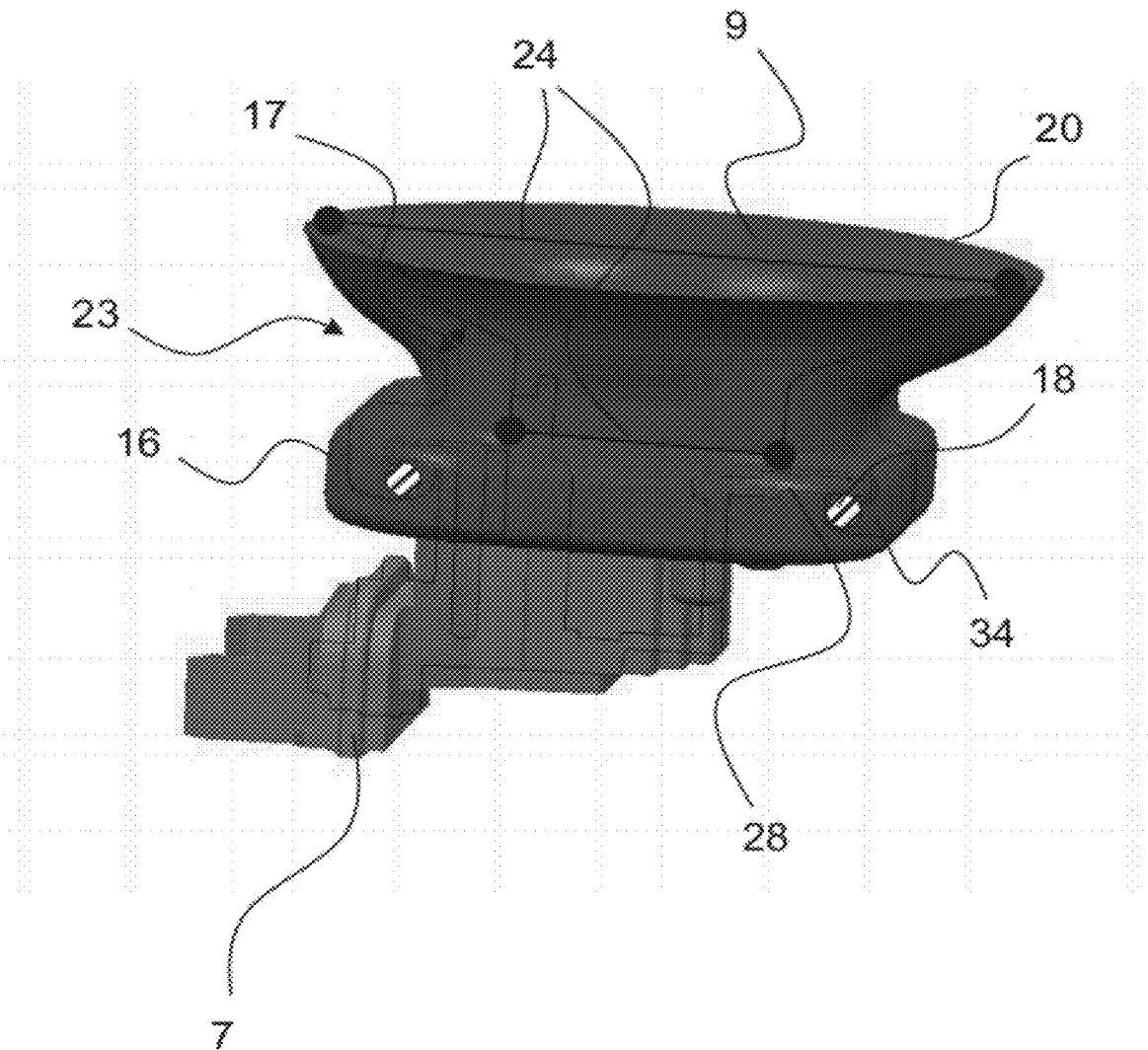
FIG. 4 shows another embodiment of a flexible collar.

Another preferred embodiment of the flexible collar 9 is shown in FIG. 4. The lower section of the figure once again shows the separate, external plug 7. This perspective drawing also shows the intersection lines as regards the cross section of the two components. In this embodiment, plug 7 contains a neck 28 positioned on the circumference. The collar 9 extends around the neck 28 and thus provides a surround 34. The flexible collar 9 also contains an embedment 18 in this area, such as a spring washer securing the surround 34. Starting from this basic section 16 of the flexible collar 9 the opening cross section 24 opens out like a cone 23. In the illustrated embodiment the opening cross section 24 close to the basic sections 16 is mainly rectangular and mainly round in the area of the sealing section 20. To provide a basic section that is as stiff as possible, the collar 9 in this area once again has a greater material thickness 17.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A device (1) for implementing a dry electrical connection of a motor vehicle lock (27), comprising:
   a fastening part (2) for a lock housing (3), wherein an electrical connection to the lock housing (3) can be implemented through an opening (4) of the fastening part (2) from a first side (5) of the fastening part (2), wherein the lock housing (3) has an external plug (7) that is positioned at a distance to the fastening part (2) and at the circumference (8) of which a flexible collar (9) is fastened, extending to the first side (5) of the fastening part (2) and forming a seal (11) with a second distance (10) to the opening (4) of the fastening part (2),
   in which the fastening part (2) in the area of the opening (4) contains a dome shape (25) towards the lock housing (3), and
   in which the lock housing (3) is fixed to the fastening part (2) with fastening means (26) that are spaced apart from the dome shape (25).

* * * * *